(12) United States Patent
Bausch

(10) Patent No.: US 6,339,816 B1
(45) Date of Patent: Jan. 15, 2002

(54) METHOD FOR IMPROVING CONTROLLABILITY IN DATA PROCESSING SYSTEM WITH ADDRESS TRANSLATION

(75) Inventor: Jean Bausch, München (DE)

(73) Assignee: Siemens Noxdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/485,971

(22) PCT Filed: Aug. 7, 1998

(86) PCT No.: PCT/DE98/02276

§ 371 Date: Feb. 18, 2000

§ 102(e) Date: Feb. 18, 2000

(87) PCT Pub. No.: WO99/09482

PCT Pub. Date: Feb. 25, 1999

(30) Foreign Application Priority Data

Aug. 19, 1997 (DE) .......................................... 197 35 948

(51) Int. Cl.⁷ .......................... G06F 12/00; G06F 12/14
(52) U.S. Cl. ...................... 711/163; 711/163; 711/206; 711/207; 711/210; 711/156; 711/164
(58) Field of Search ................................ 711/163, 164, 711/202–210, 150, 151, 152, 156; 709/100, 101, 104, 107, 108; 710/200, 240, 242, 243, 244, 14; 713/200; 714/47; 712/42, 43, 233, 228, 229, 244

(56) References Cited

U.S. PATENT DOCUMENTS

| 4,441,152 | A | * | 4/1984 | Matsuura et al. | ........... 709/251 |
|---|---|---|---|---|---|
| 4,787,031 | A | * | 11/1988 | Karger et al. | ................ 709/100 |
| 5,075,842 | A | | 12/1991 | Lai | .............................. 711/152 |
| 5,282,274 | A | * | 1/1994 | Liu | .............................. 711/206 |
| 5,530,839 | A | * | 6/1996 | komoto | ........................ 711/163 |
| 5,628,023 | A | * | 5/1997 | Bryant et al. | ................. 711/207 |
| 5,644,748 | A | * | 7/1997 | Utsunomiya et al. | ........ 711/207 |
| 5,900,019 | A | * | 5/1999 | Greenstein | ................... 711/164 |
| 5,987,557 | A | * | 11/1999 | Ebrahim | ...................... 710/200 |
| 6,041,396 | A | * | 3/2000 | Widigen | ...................... 711/206 |
| 6,044,445 | A | * | 3/2000 | Tsuda et al. | ................. 711/163 |
| 6,101,590 | A | * | 8/2000 | Hansen | ........................ 711/203 |
| 6,223,256 | B1 | * | 4/2001 | Gaither | ........................ 711/134 |
| 6,240,531 | B1 | * | 5/2001 | Spilo et al. | .................... 714/38 |

FOREIGN PATENT DOCUMENTS

EP   0 600 112 A   6/1994

OTHER PUBLICATIONS

Joseph Heinrich, Prentice Hall (1993) Translation Lookaside Buffer, MIPS RM4000 User's Manual, pp. 62ff.

* cited by examiner

Primary Examiner—Hong Kim
(74) Attorney, Agent, or Firm—Schiff Hardin & Waite

(57) ABSTRACT

When there are write accesses to user pages in a data processing system that are marked as write-protected in a translation memory, the method checks, after an interrupt request, a corresponding page table entry and also whether there is an access with system authorization. If there is an access with system authorization, the write-protection is temporarily dropped until an operating mode changes from the system to a user. In order for the write-protection to be subsequently restored, control bits are used as indicators that are used to declare entries in the translation memory affected by the system accesses to be declared invalid.

2 Claims, 1 Drawing Sheet

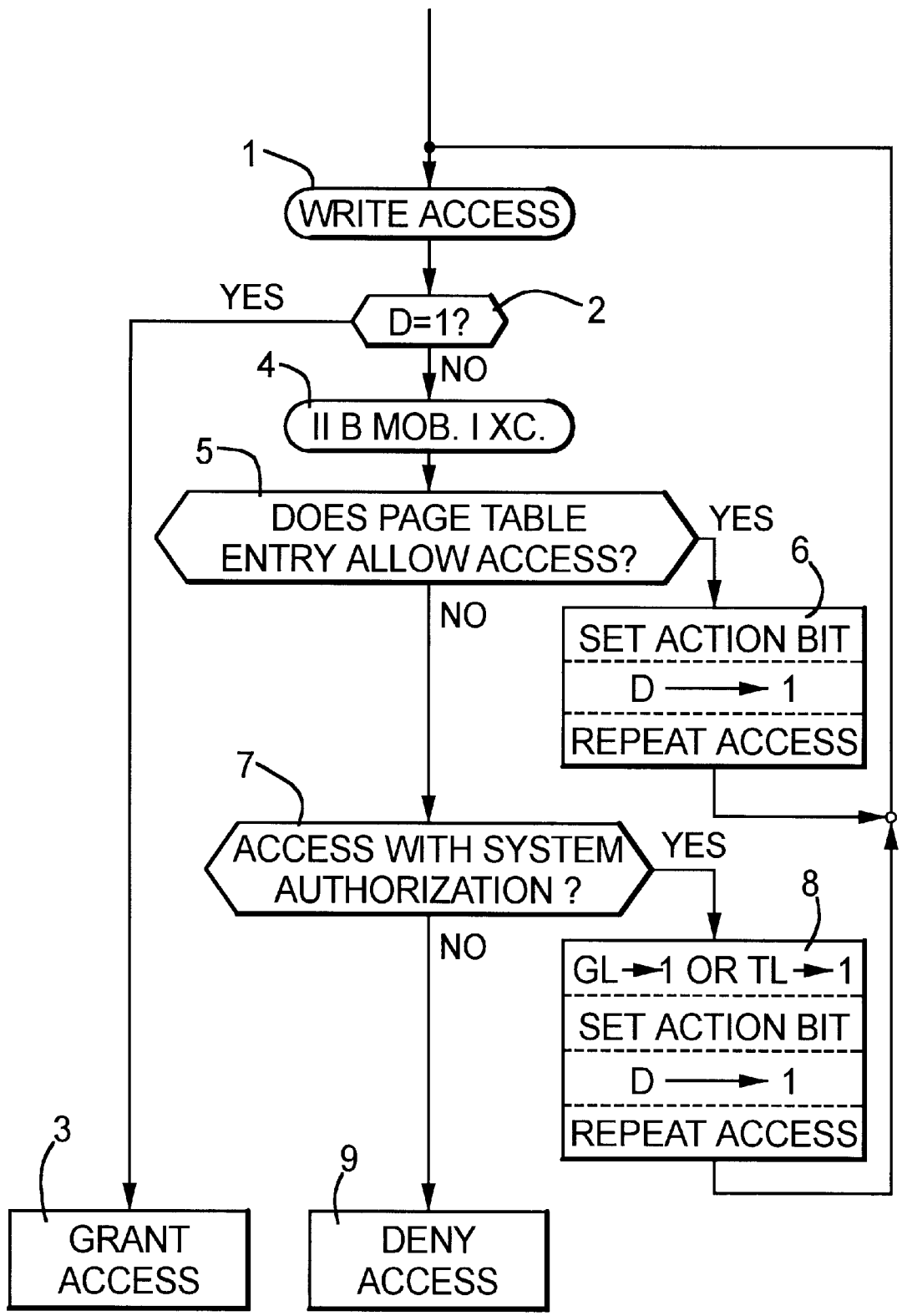

METHOD FOR IMPROVING CONTROLLABILITY IN DATA PROCESSING SYSTEM WITH ADDRESS TRANSLATION

BACKGROUND OF THE INVENTION

The present invention relates to a method for a data processing system having address conversion and using a translation memory for translated address pairs of virtual and real addresses for memory pages wherein internal control of the data processing system is improved.

Data processing systems with address translation frequently include what is known as a "Translation Lookaside Buffer" (TLB) as a translation memory, in which pairs of virtual and real addresses that are acquired in a translation are temporarily stored together with control information so that it is not necessary to always run through the full translation routine in order to acquire the real addresses to a virtual address.

Besides an identifier of the validity by means of a control bit V, what is known as a "dirty bit" D, which forms the sole write protection mechanism, frequently belongs to the control information. In the bit's ON condition, a description of the pertaining user page is allowed. On the other hand, when a write access occurs in the OFF condition, then what is known as a "TLB modified exception" is triggered. In the context of the routine thus initiated, it is then checked with the aid of additional control data in the pertaining page table entry whether or not there is a real violation of the write protection from the standpoint of the operating system. (see, e.g., "MIPS RM4000 User's Manual" (Joseph Heinrich, Prentice Hall, 1993: 62ff)).

SUMMARY OF THE INVENTION

In light of the foregoing, the present invention seeks to so define the possibilities for internal controlling of the system, given write protection, that, given a small control outlay, the advantages of such write possibilities can be exploited in pages that are inherently protected.

This is achieved by the present invention in that the internal control is additionally permitted to write on write-protected user pages as well. In this way stored data can be corrected, or new program code that is shared by several tasks can be written from the system side. To accomplish this, the write protection is temporarily dropped. In order that the write protection for the relevant pages can be restored subsequent to the execution of the write accesses with system authorization, a marking is accomplished using separate indicators.

According to further aspects of the invention, the check for the presence of write accesses with system authorization is advantageously integrated into the previously existing sequence for handling the interrupt request in write-protected pages, wherein a setting of the control bit for temporary storing by the internal control of the system makes possible a repeating of the write access, as well as additional accesses, without a new interrupt request being triggered.

The write authorization for the system is dropped when the operating mode is changed from the system to the user, respectively, in that it is first checked whether one of the control bits that forms the indicators is set. Given a set control bit for a globally used page, then all address entries in the translator memory that are related to globally used pages and whose control bit for the write authorization is set are declared invalid. On the other hand, given a set bit for a page that is used task-locally, all entries for the related task are declared invalid. This can be accomplished easily by changing the appertaining address space identifier ASID.

Additional advantages and novel features of the invention will be set forth in part in the description that follows and in part will become apparent to those skilled in the art upon examination of the following or may be learned by practice of the invention. The advantages of the invention may be realized and attained by means of the instrumentalities and combinations particlarly pointed out in the appended claims.

BRIEF DESCRIPTION OF THE DRAWINGS

Reference is made to the attached drawing wherein:

The sole FIGURE is a flow diagram of the method for controlling the data processing system according to an embodiment of the present invention.

DETAILED DESCRIPTION OF THE PREFERRED EMBODIMENTS

According to an embodiment of the present inventive method, there is a write access present, as shown in step 1 of the sole FIGURE, according to step 2 it is checked whether the control bit D that marks the write protection is set (i.e., equal to "1"). If it is, then the access can be permitted according to step 3. If not, then an interrupt request TLB MOD.EXC is triggered according to step 4. The processing of this interrupt request leads in known fashion to the checking of the appertaining page table entry according to step 5. If there is not a true violation of the write protection, then the access can be allowed. Thus, according to step 6, the corresponding action bits, (i.e., a modification bit), and the control bit D are set in known fashion so that the access can be repeated without triggering an interrupt request.

If the check according to step 5 leads to the result that the page table entry does not allow the desired write access, then the effect is that access is not denied immediately, but rather there is an additional check as to whether this is a matter of a write access with system authorization by the internal control as shown in step 7. Only if this check has a negative result is the access finally denied in step 9. If this is not the case, then the response in step 8 proceeds in the same manner as in step 6, with the exception that one of the control bits GL and TL, which form the two indicators, respectively, is additionally set. If the page in question is a globally used page, then the control bit GL is set, and in the case of a page that is used in a task-local manner, the control bit TL is set.

In the execution of steps 6 and 8, the control bit D is modified only in the entry of the translation memory TLB. The corresponding page table entry remains unaffected, such that the write protection is still noted there. On the other hand, the set control bit D makes possible the execution of write accesses without the initiating of interrupt requests until the entry is displaced or becomes invalid.

Once the operating mode has been changed, (i.e., before the first write access is triggered by a user) write accesses to write-protected system pages that have been affected by previous system accesses may not be allowed any longer. Thus, to be able to restore the write protection for the relevant pages, a list about the relevant pages would have to be consulted. However, such measures require a relatively large control outlay.

For this purpose, the present invention uses the two control bits GL and TL that are checked after the operating mode has been changed.

If the control bit GL is set, then all entries in the translation memory TLB whose control bit D is set and that relate to global user pages must be declared invalid.

Alternatively if the control bit TL is set, then only the entries of the corresponding task must be declared invalid. This is accomplished in a simple manner by modifying the address space identifier ASID that is allocated to the task. Since the control bit TL is stored in a task-local storage area in what is known as the "task control block", the check occurs only when the relevant task is activated, in contrast to the check process for the control bit GL.

Hence, in both cases it is not checked in detail which of the user pages were affected by a write access with system authorization.

The control bit GL or TL that was respectively set is then reset again. While this on has been described in connection with what is presently considered be the most practical and preferred embodiment, it is to be understood that the invention is not limited to the disclosed embodiment but, on the contrary, is intended to cover various modifications and equivalent arrangements included within the spirit and scope of the appended claims.

What is claimed is:

1. A method for a data processing system, the system having address conversion and using a translation memory for storing translated address pairs of virtual and real addresses for memory pages in connection with first control bits for marking the validity and write authorization of entries, wherein when write access is not granted the control bit for the write authorization is not set and, as a result, an interrupt request is triggered that triggers a check of the write authorization with the aid of control data present in a corresponding page table entry, the method comprising the steps of:

determining whether or not write authorization is allowed by checking the corresponding page table entry;

setting the control bit for the write authorization when it is determined that write a horization is allowed by the corresponding page table entry and repeating the write access;

checking whether or not an access with a system authorization is present when it is detersined that write authorization is not allowed by the corresponding page table entry;

setting the control bit for the write authorization without any modification to the corresponding page table entry when an access with the system authorization is present, and setting indicator as second control bits before the write access is repeated without triggering a new interrupt request and using the second control bits subsequent to the completion of the system accesses to invalidate the entries in the translation memory dependent on a type of the indicators wherein a global control bit is set when a current page is used globally and a task-local second control bit is set when the current page is used task-locally; and checking the control bits for the type of usage of the pages when an operating mode is changed from the system to a user;

wherein when global control bit is set for a the globally used page all address entries in the translation memory whose control bit for the write authorization is set and that relate to the globally used pages are declared invalid; when the task-local control bit is set for a task-locally used page, all entries of the relevant local task are declared invalid; and the respective global control bit and task-local control bit are reset after the respective globally used and task-locally used pages are declared invalid; and wherein entries of the relevant local task are declared invalid by modifying an allocated address space identifier.

2. The method as claimed in claim 1, further comprising the step of executing additional write accesses to the same page having the system authorization without triggering an interrupt request until the entry in the translation memory becomes at least one of displaced and invalid.

* * * * *